March 27, 1934.  M. L. MASTELLER  1,952,557
FLUID PRESSURE BRAKE CONTROL
Filed Oct. 27, 1932

Inventor:
Malcolm L. Masteller

Patented Mar. 27, 1934

1,952,557

UNITED STATES PATENT OFFICE 1,952,557

FLUID PRESSURE BRAKE CONTROL

Malcolm L. Masteller, Miami, Fla.

Application October 27, 1932, Serial No. 639,887

3 Claims. (Cl. 303—84)

My invention relates to improvements in hydraulic braking apparatus such as is used in connection with four wheel hydraulic brakes for motor vehicles and particularly to the liquid control mechanism for such apparatus.

Insofar as I am aware the movement and pressure of the liquid in all such systems is now controlled from a single cylinder by a single plunger operated by the brake pedal of the vehicle and a single conduit leading from the cylinder to all of the wheel braking units. The result is that if the conduit leading should spring a leak from any cause the entire braking system is rendered inoperative. Since such an occurrence is liable to happen at any time and would not be noted until an attempt was made to apply the brakes it constitutes a serious menace to the car, its passengers and the public.

The principal object of my invention therefore, is to provide a simple and inexpensive device which will eliminate the possibility of leakage or line rupture putting the entire system out of commission.

It is a further object of my invention to provide means for controlling the relative braking force exerted on the front wheels and rear wheels respectively of the vehicle to the end that while the said force is practically equalized it may be last applied to either pair and first released therefrom while at the same time it cannot attain a sufficient relative volume on the steering wheels to slide them irrespective of how great a force may be applied to the others.

It is a further object of my invention to provide a device which will attain the above stated objects without constituting a complete braking system but can be easily built into any hydraulic braking system of the general character described without substantially altering it.

These objects I accomplish by means of an auxiliary fluid motor to be connected in the feed line of any such system intermediate to the compressing master cylinder and the wheel units and at the nearest practicable point to the master cylinder, the structure of which and the relative arrangement of its parts is fully set forth in the following specifications and claims and illustrated in the attached drawing to which reference is made.

Figure 1:
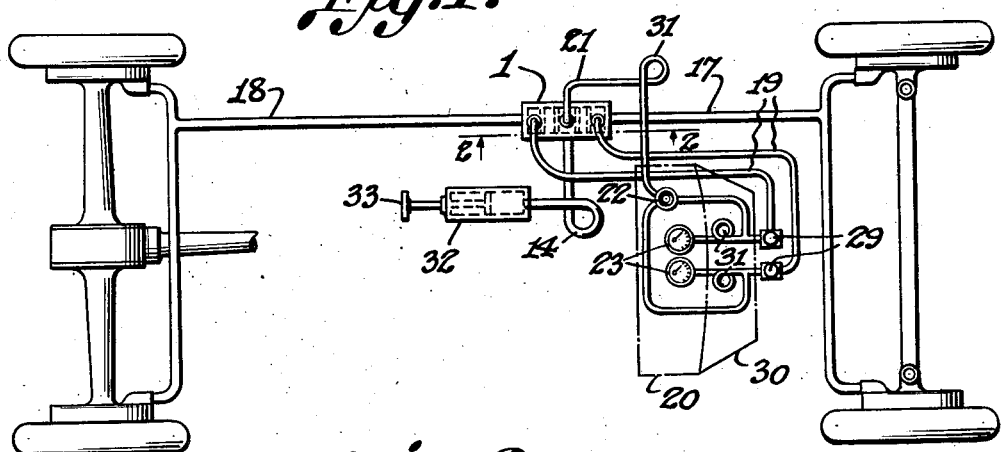
Figure 1 is a diagrammatic showing of my invention.
Figure 2:
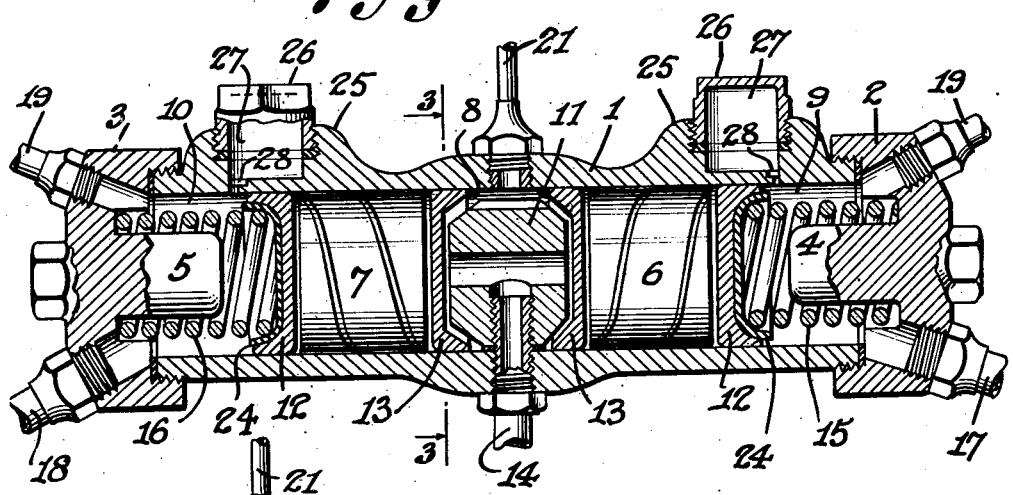
Figure 2 is a section taken approximately on the line 2—2 of Figure 1.
Figure 3:
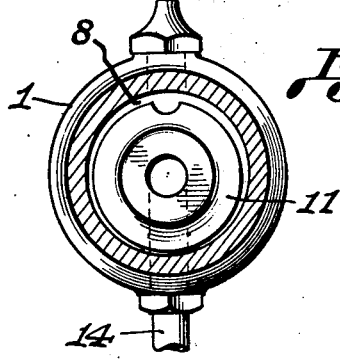
Figure 3 is a section taken on the line 3—3 of Figure 2.

The auxiliary fluid motor, subject of this invention, consists of a cylinder casing 1 closed at both ends by detachable heads 2—3 of which the bosses 4—5 form end piston stops. Two opposed fluid-tight pistons 6—7 operating in this cylinder divide it into three compartments 8—9—10 all being filled with the brake actuating liquid. The normal or off position of these pistons is against the central piston stop 11 which almost fills the central compartment 8 when the pistons are in the off position, it being centrally fixed in such manner that the liquid can percolate around and/or through it. The pistons 6—7 are grooved circumferentially for the collection of foreign matter and to facilitate their lubrication. They are provided with suitable cup packing at both ends 12—12—13—13, all cups facing away from the pistons.

The liquid set in motion by the master cylinder 32 of the braking system, which is not a part of this invention, enters the auxiliary cylinder 1 through the conduit 14 connected to its central compartment 8 between the two pistons 6—7, driving them outwardly against the resistance of the liquid in end compartments 9—10 and of retracting springs 15—16, reducing the size of end compartments 9—10 and forcing liquid therefrom into the two conduits 17—18 leading to the front and rear wheel brake units respectively. The movement of the pistons causes sufficient displacement to completely and effectively apply the brakes and when this is accomplished the pistons rest against or in close proximity to the end piston stops 4—5 which limit their travel. Hence if one of the lines should be ruptured the corresponding piston can go but slightly beyond its usual course, thereby conserving the liquid supply so that the other piston will perform its normal function. It will therefore be seen that in normal working the pistons will idle to and fro with the liquid, just as though they formed a part of it, and become effectively operative only to check the flow as described herein.

In order that the driver may, from his seat, know and adjust the pressure and liquid in each compartment of the motor, the end compartments 9—10 are each provided with a conduit 19—19 leading to pressure gages 23—23 on the instrument board 20 of the vehicle, each of said conduits having a branch leading to a shut off valve 22, the normal position of which is closed, located on the instrument board 20, or adjacent thereto, to a third opening of which is attached a conduit 21 leading from the top of central compartment 8. Hence when the gages show an insufficiency of pressure in the wheel lines, or either of them, the driver has but to open the valve 22 and pump up the system in the usual manner.

Siphons 31—31—31 may be used in lines 19—19—21 to minimize the stresses on the corresponding gage and/or shut off valve, and, for the same purpose, these conduits 19—19—21 may be of smaller bore than conduits 17—18 leading to the wheel brake units.

Between the retracting springs 15—16 and the piston cup packings 12—12 are placed metal adapters 24—24 whch serve as spring seats and are cupped to fit over the end of the springs and each other. They may be of various thicknesses, and any required number may be used, for the purpose of adapting the machine to the vehicle to which it is to be applied according to the displacement required to operate its brakes, it being obvious that a thicker adapter will cause a corresponding restriction to the travel of the piston.

By inserting more adapters, or a thicker one, in one of the end compartments than in the other, one of the pistons can be brought to rest against its end stop when a predetermined pressure has been attained in the corresponding wheel line while pressure is still being built up in the other one. Also a compression spring of heavier construction may be used in one end compartment than that used in the other, causing a greater resistance in the corresponding piston. These differentials may be utilized to regulate the relative braking force to be applied to the front and rear wheels respectively.

Bosses 25—25, near the ends of the cylinder casing 1, are chambered to receive hollow caps 26—26 for the purpose of forming air chambers 27—27 which communicate through ports 28—28 with end compartments 9—10 when the pistons 6—7 are in their retracted positions. These air chambers 27—27 act as cushions to take up against compressed air any tightness due to heat expansion and return the corresponding liquid to the end compartments 9—10 and wheel lines when contraction occurs. Air chambers 27—27 also serve to pass liquid over the lip of packing cups 12—12 for replenishing lubrication of the pistons 6—7. The ports 28—28 also serve as bleeding vents for the end compartments 9—10, the caps 26—26 being removed while the system is being initially filled, and inserted only after a predetermined quantity of liquid stands in the sumps at their base.

Other bleeder vents and plugs are to be used wherever required for the proper elimination of air. In this form bleeders 29—29 are shown on the forward side of the dash 30 at the topmost point of conduits 19—19.

Having thus described my invention but without limiting myself thereto, what I claim and desire by Letters Patent to secure is.

I claim:

1. The combination with the pressure lines of a hydraulically actuated braking system of a fluid motor comprising a cylinder casing, closed at both ends by detachable heads, the cylinder being divided into three compartments by two opposed fluid-tight pistons, operable reciprocally therein, movable outwardly by the pressure of the liquid from the compressor of the braking system entering the central compartment of the motor, and inwardly, when the said pressure is released, by the pressure of the liquid returning from the wheel lines, which is set in motion by the retracting springs of the brake shoes and enters the end compartments of the motor; supplemental mechanical means, consisting of compression springs, to retract the pistons in the event of an insufficiency of hydraulic pressure; each piston controlling a conduit leading to one half of the wheel braking units of the vehicle as of the front and rear wheels respectively; and means, consisting of end stops, to limit the travel of the pistons to a movement sufficient to properly apply their respective brakes and no more, the said motor being provided with air chambers, one at either end, normally communicating with the end compartments, and wheel lines beyond, through ports located immediately adjacent to the pistons which close them off when advancing, thereby interrupting the said communication during each braking operation, to act as cushions, constituting automatic means for taking up, against compressed air, any excess of liquid in the wheel lines due to expansion from temperature variations and returning the corresponding liquid to the wheel lines when contraction occurs, the said motor being further provided with means enabling the driver, at all times and from his seat, to know and adjust the pressure and liquid in each of its compartments, consisting of pressure gages and shut off valves on the instrument board of the vehicle, or adjacent thereto, connected by conduit to each of them, all comprising a liquid control mechanism whereby in case of leakage or line rupture beyond one of said pistons the liquid supply will be conserved and enable the other piston to perform its normal function, thereby assuring a full application of brakes to at least one pair of wheels.

2. The combination in a fluid pressure motor, auxiliary to a fluid pressure braking system for motor vehicles, as described in claim No. 1 hereof, of convenient mechanical means for adapting the machine to the vehicle to which it is to be applied, according to the displacement required to operate its brakes, consisting of metal adapters, which may be of various thicknesses, cupped to fit over the end of the piston retracting springs, and each other, to be inserted between the piston cup packing and the retracting springs, thereby reducing the travel of the pistons and the displacement of liquid.

3. The combination in a fluid pressure motor, auxiliary to a fluid pressure braking system for motor vehicles, as described in claim No. 1 hereof, of means for regulating the relative braking force to be applied to the front and rear wheels respectively of the vehicle, consisting of differentials in the respective end compartments, created, firstly, by having one retracting spring of slightly heavier construction than the other, causing the corresponding piston to oppose the flow of liquid in such manner that its force will be transferred to a greater extent through the other one, and, secondly, by slightly restricting the travel of the piston in one end compartment as compared with that in the other, causing the piston to come to rest against its end stop when a predetermined pressure has been attained in the corresponding wheel line while pressure is still being built up in the other one.

MALCOLM L. MASTELLER.